(12) United States Patent
Häfele (10) Patent No.: US 12,012,146 B2
(45) Date of Patent: Jun. 18, 2024

(54) HEAVY-LOAD VEHICLE

(71) Applicant: GOLDHOFER AG, Memmingen (DE)

(72) Inventor: Horst Häfele, Babenhausen (DE)

(73) Assignee: GOLDHOFER AG, Memmingen (DE)

( * ) Notice: Subject to any disclaimer, the term of this patent is extended or adjusted under 35 U.S.C. 154(b) by 0 days.

(21) Appl. No.: 17/289,985

(22) PCT Filed: Mar. 5, 2020

(86) PCT No.: PCT/EP2020/055881
§ 371 (c)(1),
(2) Date: Apr. 29, 2021

(87) PCT Pub. No.: WO2021/175429
PCT Pub. Date: Sep. 10, 2021

(65) Prior Publication Data
US 2022/0402549 A1    Dec. 22, 2022

(51) Int. Cl.
*B62D 21/04*   (2006.01)
*B62D 21/20*   (2006.01)
*B62D 53/06*   (2006.01)

(52) U.S. Cl.
CPC .............. *B62D 21/04* (2013.01); *B62D 21/20* (2013.01); *B62D 53/061* (2013.01); *B62D 53/067* (2013.01)

(58) Field of Classification Search
CPC ........ B62D 21/04; B62D 21/14; B62D 21/20; B62D 53/061; B62D 53/067; B60P 3/40
See application file for complete search history.

(56) References Cited

U.S. PATENT DOCUMENTS 2,770,490 A * 11/1956 Hockensmith, Jr. ........................ B62D 53/067
298/22 R
4,017,094 A * 4/1977 Pilcher ...................... B60P 3/40
280/442

(Continued)

FOREIGN PATENT DOCUMENTS

DE          3447052 A   *  6/1986  ............. B62D 21/14
DE    202013104703 U1     4/2014

(Continued)

OTHER PUBLICATIONS

LEWIS, Pendulum Axle for Utility Vehicle, Jan. 31, 1996, EPO, EP 0694430 A1, Machine Translation of Description (Year: 1996).*

(Continued)

*Primary Examiner* — Amy R Weisberg
*Assistant Examiner* — Matthew D Lee
(74) *Attorney, Agent, or Firm* — Kilpatrick Townsend & Stockton LLP (57) ABSTRACT

The invention relates to a heavy-load vehicle comprising at least two partial vehicles, namely a frontmost partial vehicle and a rearmost partial vehicle, said frontmost partial vehicle having connecting means, and said rearmost partial vehicle having counter-connecting means adapted and configured for cooperating with said connecting means, one of said connecting means and said counter-connecting means including an inner telescopic member guided in a hollow outer telescopic member in a telescoping manner. According to the invention said hollow outer telescopic member is integrally formed by a tubular or box-shaped central part of a partial vehicle frame of one of the partial vehicles, said hollow outer telescopic member and said inner telescopic member cooperating therewith being parts of the same partial vehicle.

18 Claims, 6 Drawing Sheets

(56) References Cited

U.S. PATENT DOCUMENTS

| | | | |
|---|---|---|---|
| 4,740,007 A | 4/1988 | Lutz et al. | |
| 4,955,629 A * | 9/1990 | Todd, Jr. | B62D 53/067 |
| | | | 280/411.1 |
| 2012/0148362 A1* | 6/2012 | Lawlor | B62D 63/068 |
| | | | 410/44 |
| 2013/0038043 A1* | 2/2013 | Brown | B62D 21/14 |
| | | | 280/656 |
| 2016/0257361 A1* | 9/2016 | Habernegg | B62D 61/10 |

FOREIGN PATENT DOCUMENTS

| | | | | |
|---|---|---|---|---|
| DE | 102021001083 A1 * | 9/2022 | | |
| EP | 0107746 A1 | 5/1984 | | |
| EP | 553929 A1 * | 8/1993 | | B60D 1/155 |
| EP | 0694430 A1 * | 1/1996 | | B60K 17/34 |
| GB | 2413995 A * | 11/2005 | | B60P 1/6481 |
| JP | 2010149722 A | 7/2010 | | |
| WO | 2016162115 A1 | 10/2016 | | |

OTHER PUBLICATIONS

International Application No. PCT/EP2020/055881, International Search Report and Written Opinion dated Nov. 11, 2020, 11 pages.
Japanese Application No. 2022-544187 , "Office Action", Dec. 20, 2023, 15 pages.

* cited by examiner

HEAVY-LOAD VEHICLE

CROSS REFERENCE TO RELATED APPLICATION

This application is a U.S. national phase of International Patent Application No. PCT/EP2020/055881 filed on Mar. 5, 2020, the entire contents of which are hereby incorporated herein by this reference.

DESCRIPTION

The invention relates to a heavy-load vehicle comprising at least two partial vehicles, namely a frontmost partial vehicle including or being connected to a tow connection device for connecting said heavy-load vehicle to a towing vehicle not being part of the heavy-load vehicle, and a rearmost partial vehicle, said frontmost partial vehicle having connecting means, and said rearmost partial vehicle having counter-connecting means adapted and configured for cooperating with said connecting means for operatively connecting said frontmost partial vehicle and said rearmost partial vehicle to each other, one of said connecting means and said counter-connecting means including an inner telescopic member guided in a hollow outer telescopic member in a telescoping manner.

It should be noted that in the context of the present invention a heavy-load vehicle is understood to be a vehicle having an admissible overall weight of at least 30 t.

US 2016/0137238 A1 discloses a heavy-load vehicle designed as a semi-trailer including three partial vehicles. The frontmost partial vehicle has a gooseneck including a fifth-wheel coupling as a tow connection device. Furthermore, a central part of a partial vehicle frame of the frontmost partial vehicle is formed as a tube or box open to the rear side thereof. The tubular or box-shaped central part of the partial vehicle frame acts as a hollow outer telescopic member and is intended to receive an inner telescopic member, which is integrally formed at and rigidly protruding from the front side of the partial vehicle frame of a center partial vehicle, in a telescoping manner. Finally, the inner telescopic member as well as the central part of the partial vehicle frame of the center partial vehicle are formed as a tube or box open to the rear side of the center partial vehicle. In this way, they act as a further hollow outer telescopic member for a further inner telescopic member integrally formed at and rigidly protruding from the front side of the partial vehicle frame of a rearmost partial vehicle.

Based on this construction, the heavy-load vehicle known from US 2016/0137238 A1 may be extended between a shortest configuration, in which all three partial vehicles are arranged in immediate vicinity to each other, the inner telescopic members being completely inserted into the respective hollow outer telescopic members of the preceding partial vehicles, and a longest configuration, in which the inner telescopic members have been pulled out from the respective hollow outer telescopic members to the maximum possible amount. In this way, the heavy-load vehicle may be adapted to loads of different lengths which have to be transported from a transport start location to a transport end location. However, due to the respective lengths in particular of the center and rear partial vehicles and the inner telescopic members protruding therefrom, it is very complicated and cost-intensive to deliver the heavy-load vehicle from a depot to the transport start location and from the transport end location back to the depot. In this context, it is to be noted that each of the partial vehicles of the heavy-load vehicle known from US 2016/0137238 A1 usually is individually delivered to the transport start location and from the transport end location back to the depot on the loading area of a conventional truck.

An alternative concept allowing to adapt the heavy-load vehicle to loads of different lengths includes a plurality of non-telescopic partial vehicles which may connected to each other either directly or by arranging separately provided partial vehicle connection devices between immediately consecutive partial vehicles. In particular, this concept provides different types of partial vehicle connection devices, i.a. a telescopable partial vehicle connection device. Although it is, due to their limited lengths, considerably easier to deliver the partial vehicles and the partial vehicle connection devices required for assembling a desired heavy-load vehicle from a depot to the transport start location and from the transport end location back to the depot, it requires a huge amount of care and logistical effort to make sure that really all components, in particular all telescopable partial vehicle connection devices, are delivered to the transport start location, in order to be able to assemble the heavy-load vehicle required for transporting the respective load.

In view of the above, it is the object of the present invention to provide a heavy-load vehicle avoiding the afore-mentioned problems.

According to the present invention, this object is solved by a heavy-load vehicle of the afore-mentioned type, in which said hollow outer telescopic member is integrally formed by a tubular or box-shaped central part of a partial vehicle frame of one of the partial vehicles, said hollow outer telescopic member and said inner telescopic member cooperating therewith being parts of the same partial vehicle.

According to the invention, the cooperating inner and outer telescopic members are integrated in one and the same partial vehicle. As a consequence and in contrast to the afore-discussed alternative concept, the telescopic members do not constitute separate components which have to be delivered separately to the transport start location. Thus, whenever the required number of partial vehicles is delivered to the transport start location, it is guaranteed that a sufficient number of telescopic members is delivered to the transport start location as well.

Furthermore, the inner telescopic member of a partial vehicle may be retracted into the cooperating hollow outer telescopic member of the same partial vehicle, thus reducing the overall length of the partial vehicles, in particular as compared to the heavy-load vehicle known from US 2016/0137238 A1. If said inner telescopic member has a length which is equal to or less than the length of the outer telescopic member, the overall length of the partial vehicle may even be reduced to the length of the partial vehicle as such.

A further advantage of the heavy-load vehicle according to the present invention over the heavy-load vehicle known from US 2016/0137238 A1 resides in the fact that the heavy-load vehicle according to the present invention can be constituted by any number of partial vehicles, as its construction principle isn't limited by the diameter of the telescopic inner members. In contrast, according to US 2016/0137238 A1, the diameter of the telescopic inner member is continuously decreasing from partial vehicle to partial vehicle, as all telescopic inner members are engaging into each other.

It should be noted in the context with the present invention that in addition to the connecting means adapted and configured for connecting two adjacent partial vehicles, telescoping state fixing means are provided, which are formed separately from the connecting means and which are adapted and configured to fix specific telescoping states between the inner telescopic member and the hollow outer telescopic member. In particular, the telescoping states between and including a fully retracted state and a fully extended state of the inner and outer telescopic members could be chosen in a stepped or a continuous manner.

If the heavy-load vehicle, according to one alternative of the present invention, further comprises a vehicle end unit attachable to a rear end of said rearmost partial vehicle, the number of partial vehicles may be increased by using only two types of partial vehicles, namely said frontmost partial vehicle and a plurality of identically designed further partial vehicles, one of which constitutes the rearmost partial vehicle by having the vehicle end unit attached thereto. The vehicle end unit may, for example, include indication light elements, e.g. brake lights, turn indicators and the like, which might be required according to national laws.

According to a second alternative, it is however also conceivable that the heavy-load vehicle includes at least three types of partial vehicles, namely said frontmost partial vehicle, said rearmost partial vehicle and at least one intermediate partial vehicle, said at least one intermediate partial vehicle having a hollow outer telescopic member and an inner telescopic member guided in said outer telescopic member in a telescoping manner, said hollow outer telescopic member being integrally formed by a tubular or box-shaped central part of a partial vehicle frame of said at least one of intermediate partial vehicle, said hollow outer telescopic member and said inner telescopic member cooperating therewith being parts of the same intermediate partial vehicle. According to this embodiment, the number of partial vehicles may be increased by arranging a desired number of intermediate partial vehicles between said frontmost partial vehicle and said rearmost partial vehicle. In this case the rearmost partial vehicle may include the vehicle end unit as an integral part thereof.

According to a further embodiment of the present invention, the inner telescopic member may be adapted to extend out of the cooperating hollow outer telescopic member to the rear side of the respective partial vehicle. In this case, the rearmost partial vehicle may be free from any telescopic member, while the at least one partial vehicle, preferably all partial vehicles, arranged in front of said rearmost partial vehicle may include inner and outer telescopic members.

According to a further embodiment of the present invention, the inner telescopic member may be adapted to extend out of the cooperating hollow outer telescopic member to the front side of the respective partial vehicle. In this case, the frontmost partial vehicle may be free from any telescopic member, while the at least one partial vehicle, preferably all partial vehicles, arranged behind said frontmost partial vehicle may include inner and outer telescopic members.

In order to be able to increase the distance between immediately consecutive partial vehicles to values exceeding the length of the partial vehicle frame, said inner telescopic member may include an inner telescopic element guided in a hollow intermediate telescopic element in a telescoping manner, which in turn is guided in said hollow outer telescopic member in a telescoping manner. Of course, more than the afore-described two telescoping levels are conceivable.

If said outer telescopic member and said inner telescopic member, and optionally said at least one intermediate telescopic member, have a rectangular cross-section, warping of the heavy-load vehicle around its longitudinal axis may be reduced, if not excluded.

According to a further embodiment, a first plate part of a bolt-plate coupling may be mounted at the free end of the inner telescoping member of a first of two immediately consecutive partial vehicles, while a second plate part designed to cooperate with said first plate part via a bolt of said bolt-plate coupling may be mounted to a facing end of a second of said two immediately consecutive partial vehicles. In particular, the first plate part may be welded to the free end of said inner telescopic member, while the second plate part may be welded to the facing end of a partial vehicle frame of the second of said two immediately consecutive partial vehicles. According to alternative embodiments, the connecting means could also be designed as parts of at least one of a hook coupling, a longitudinal bolt coupling and a coupling by screwing coupling parts together, e.g. using horizontally extending connection plates.

Similar to the heavy-load vehicle disclosed by US 2016/0137238 A1, the tow connection device of the frontmost partial vehicle of the heavy-load vehicle of the present invention may include a gooseneck. However, it is also conceivable that the tow connection device of the frontmost partial vehicle of the heavy-load vehicle of the present invention includes a drawbar.

According to a further embodiment, at least two of the partial vehicles, preferably all partial vehicles, may include at least one wheeled axle, preferably at least two wheeled axles, more preferably at least three wheeled axles. In this context, it should be noted that a wheeled axle, according to a common constructional concept, may include at least two wheeled axle units, namely preferably a left axle unit located at a left side of the respective partial vehicle and a right axle unit located at a right side of the respective partial vehicle. Furthermore, a wheeled axle unit may have one wheel including a tire mounted on a rim, two wheels, namely a left wheel located at the left side of a wheel carrier of the axle unit and a right wheel located at the right side of said wheel carrier, each wheel including a tire mounted on a rim, or four wheels in paired arrangement, a left pair of wheels located at the left side of a wheel carrier of the axle unit and a right pair of wheels located at the right side of said wheel carrier, each wheel including a tire mounted on a rim, the two wheels of a pair being mounted to the same hub.

According to a specific embodiment, at least two of the partial vehicles, preferably all partial vehicles, may include three wheeled axles, wherein each wheeled axle may include two wheeled axle units. Furthermore, at least one wheeled axle unit, preferably all wheeled axle units, is/are designed as, preferably actively steerable, pendular axle unit(s) or full-floating axle unit(s). Furthermore, each wheeled axle unit may have on each of its sides one tire (single tire) or two tires (twin tire), each tire being mounted on a respective rim.

In this context it is to be emphasized that only vehicles the axle units of which are adapted for supporting loads of at least 4 tons per axle unit, preferably at least 5 tons per axle unit, more preferably at least 6 tons per axle unit, even more preferably at least 10 tons per axle unit, are considered to be heavy-load vehicles according to the present invention.

In the following, the invention will be described in more detail with respect to a specific embodiment referring to the enclosed drawings, in which.

In FIGS. 1 to 5 a heavy-load vehicle according to the present invention is generally designated by reference numeral 100. The heavy-load vehicle 100 comprises a frontmost partial vehicle 102 and a rearmost partial vehicle 104. The frontmost partial vehicle 102 has a gooseneck 106 including a fifth-wheel coupling 108 (see FIG. 3) as a tow connection to a tractor or towing vehicle not shown.

Figure 1:
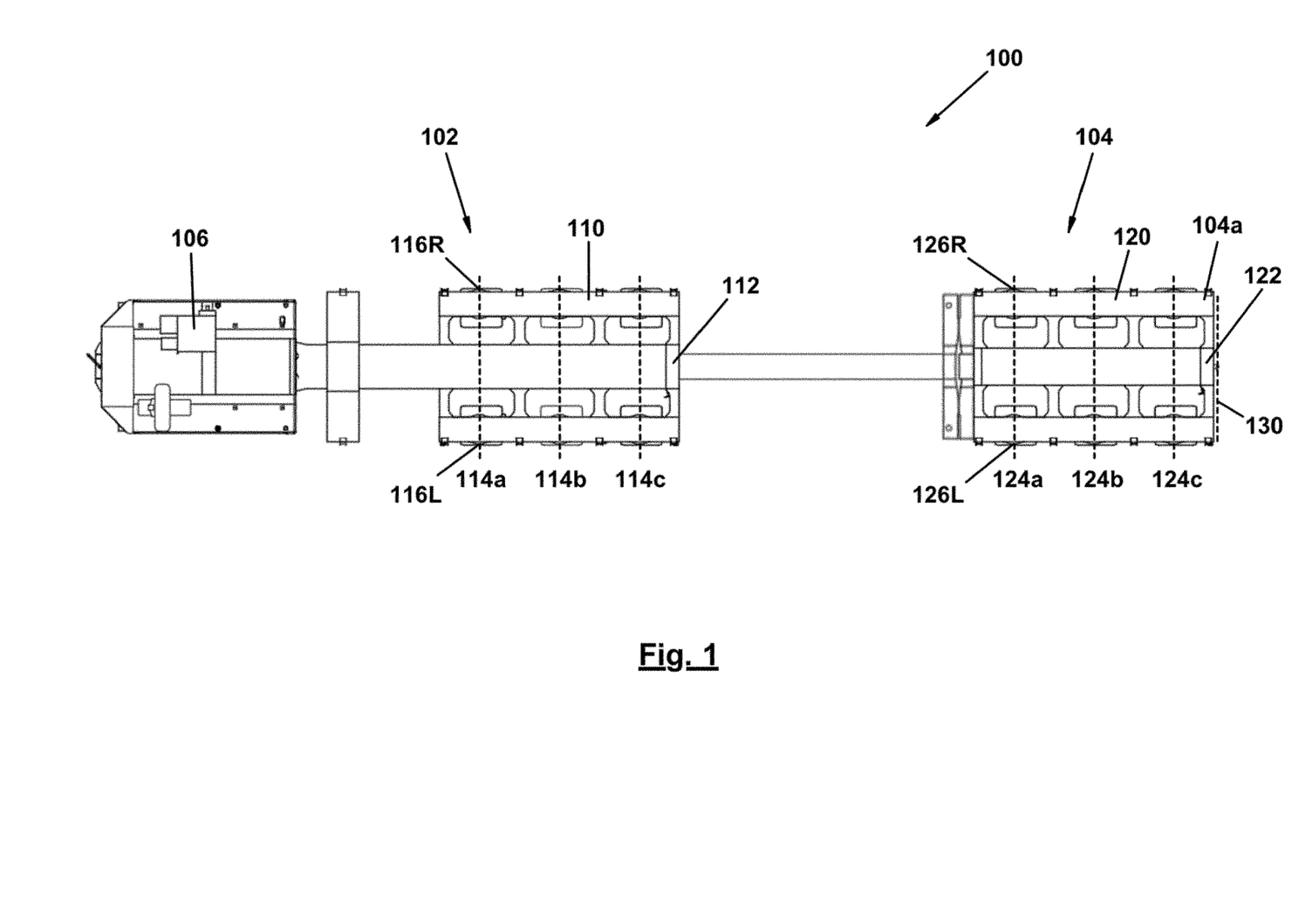
FIG. 1 shows a plan view of a heavy-load vehicle according to a first embodiment of the present invention in its extended state.
Figure 2:
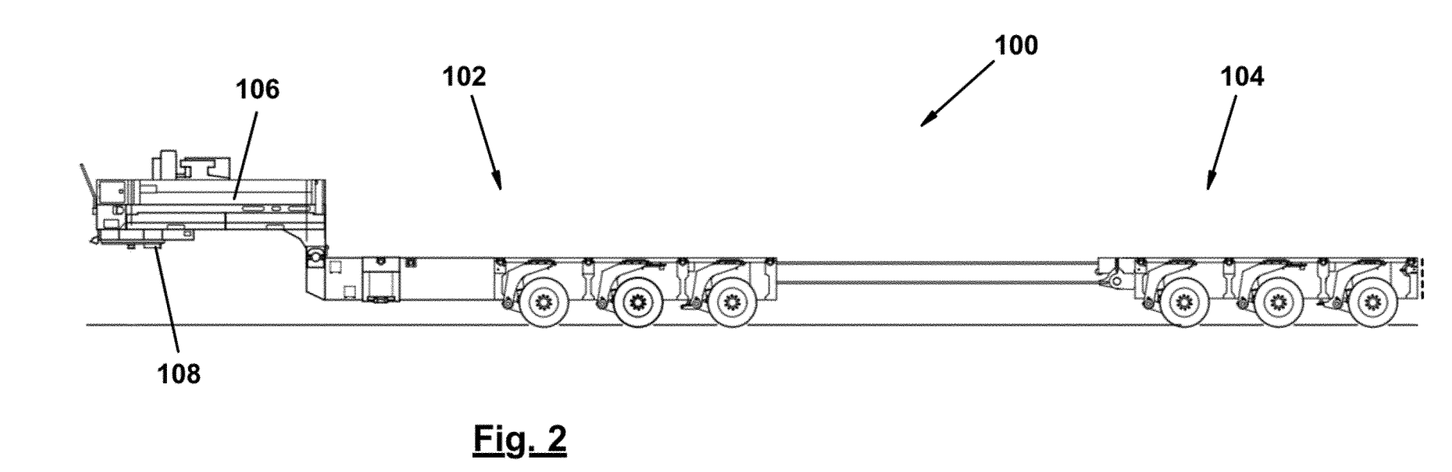
FIG. 2 shows a side view of the heavy-load vehicle of FIG. 1.
Figure 3:
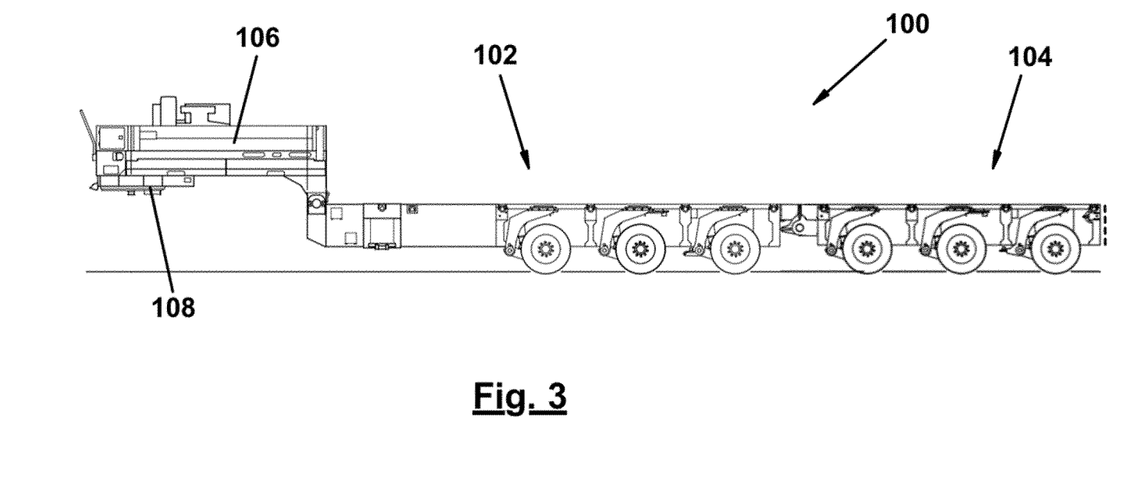
FIG. 3 shows a side view similar to FIG. 2 of the heavy-load vehicle of FIG. 1 in its compact state.

A chassis 110 of the frontmost partial vehicle 102 includes a frame 112 and three wheeled axles 114a, 114b and 114c, each having two wheeled axle units, namely a left axle unit 116L and a right axle unit 116R, indicated only for the first wheeled axle 114a.

Analogously, a chassis 120 of the rearmost partial vehicle 104 includes a frame 122 and three wheeled axles 124a, 124b and 124c, each having two wheeled axle units, namely a left axle unit 126L and a right axle unit 126R.

Figure 4:
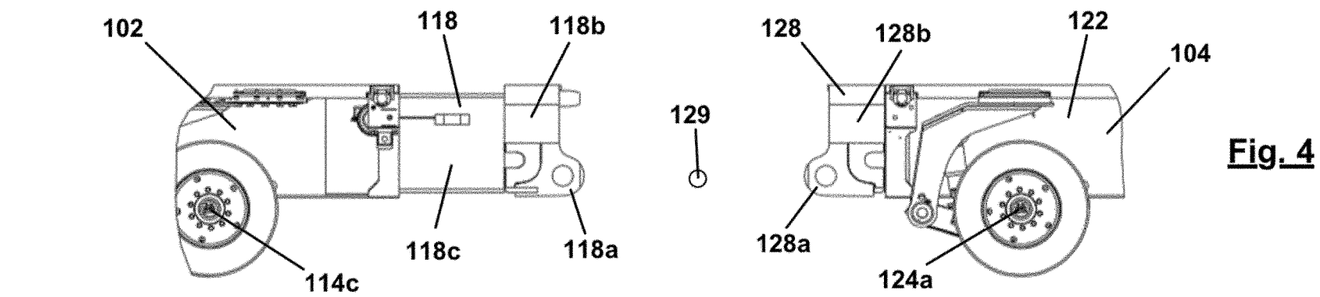
FIGS. 4 and 5 show a side view (FIG. 4) and a plan view (FIG. 5) of parts of two consecutive, but separated partial vehicles.
Figure 5:
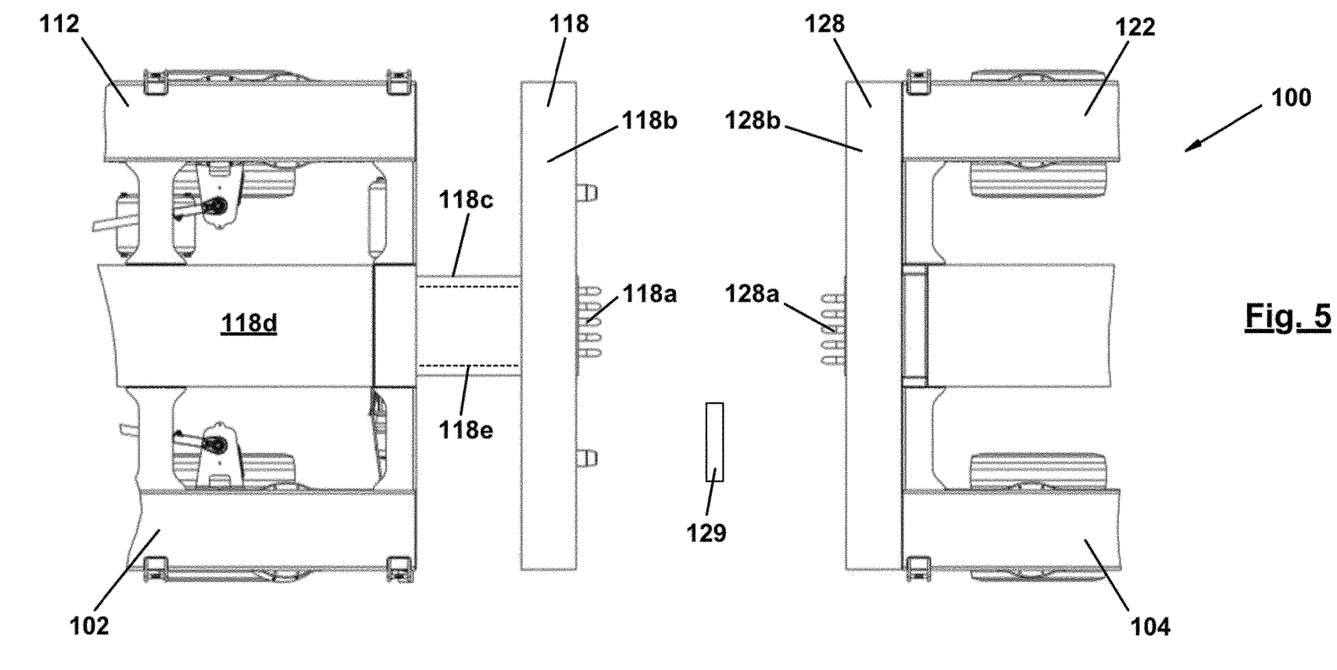

As may be seen from FIGS. 4 and 5, the frontmost partial vehicle 102 has connecting means 118, while the rearmost partial vehicle 104 has counter-connecting means 128 adapted and configured for cooperating with said connecting means 118 for operatively connecting the frontmost partial vehicle 102 and the rearmost partial vehicle 104 to each other. Both connecting means include elements of a bolt-plate coupling. In particular, the connecting means 118 of the frontmost partial vehicle 102 includes a plate part 118a of the bolt-plate coupling, while the counter-connecting means 128 of the rearmost partial vehicle 104 includes a counter-plate part 128a of the bolt-plate coupling. Both plate parts 118a, 128a may be connected to each other by means of a bolt 129.

The plate parts 118a and 128a are mounted to cross-beams 118b and 128b, respectively. While the cross-beam 128b is rigidly mounted to the frame 122 of the rearmost partial vehicle 104, the cross-beam 118b is rigidly mounted to an inner telescopic member 118c telescopably guided in a hollow outer telescopic member 118d (see FIG. 5) which is integral part of the frame 112 of the frontmost partial vehicle 102.

It is important to note that inner telescopic member 118c and the outer telescopic member 118d are parts of one and the same partial vehicle, namely in the embodiment of FIGS. 1 to 5 part of the frontmost partial vehicle 102. Accordingly, the inner telescopic member 118c may be retracted into the outer telescopic member 118d, thus shortening the length of the frontmost partial vehicle 102. As may be seen, for example, from FIG. 3, the inner telescopic member 118c advantageously may be fully retracted into the outer telescopic member 118d resulting in a minimum length of the frontmost partial vehicle 102 in its compact state.

Although, according to the embodiment of FIGS. 1 to 5, the inner telescopic member 118c and the outer telescopic member 118d merely provide for a one-level telescopability, an intermediate telescopic element schematically indicated in FIG. 5 by dashed lines 118e, may be sandwiched in a telescoping manner between the outer telescopic member 118d and the inner telescopic member 118c in order two provide a two-level telescopability. And, in principle, even higher-level telescopabilities are conceivable by providing further intermediate telescopic elements.

As schematically indicated in FIG. 1 by a dashed line, the rearmost partial vehicle 104 may be equipped at its rear end 104a with a vehicle end unit 130 which forms an integral part of the rearmost partial vehicle 104. This vehicle end unit 130 may, for example, include indication elements, e.g. brake lights, turn indicators and the like, which might be required according to national laws.

As a consequence of this design, the rearmost partial vehicle 104 doesn't include any telescoping element. It is, however, also conceivable that the telescopic element is provided in the rearmost partial vehicle and extends from the front end thereof towards the frontmost partial vehicle.

Figure 6:
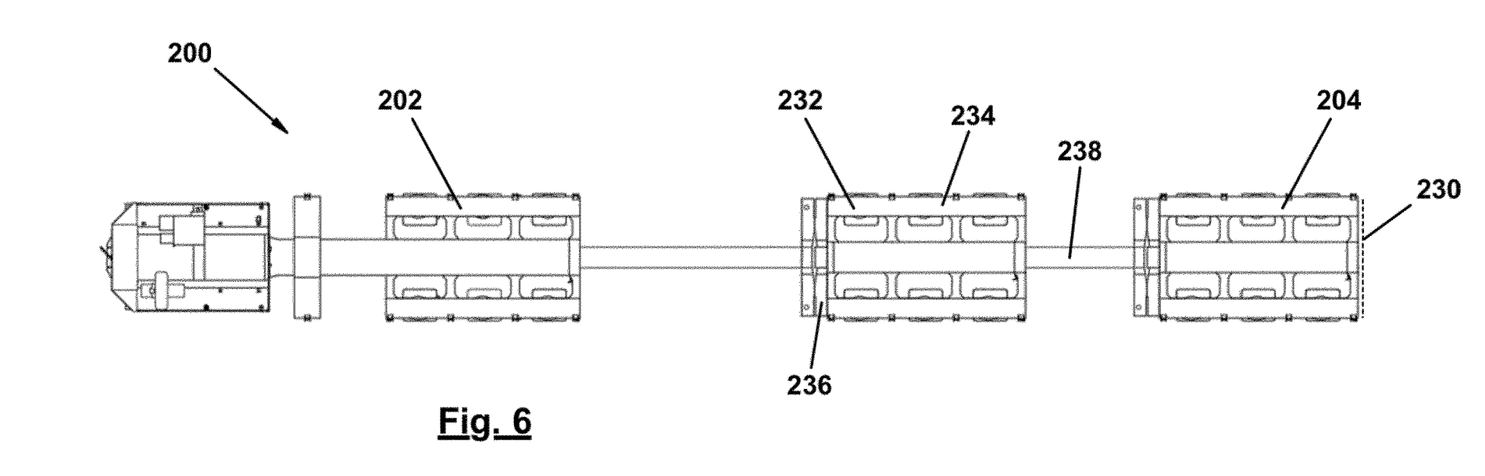
FIGS. 6 to 10 show further embodiments of heavy-load vehicles according to the present invention.

FIG. 6 shows a plan view of a further heavy-load vehicle according to the present invention, which substantially corresponds to the heavy-load vehicle of FIG. 1 to 5. As a consequence, analogous parts are designated by the same reference numerals as in FIGS. 1 to 5, but increased by 100. Furthermore, the heavy-load vehicle 200 of FIG. 6 will be described only insofar it differs from the heavy-load vehicle 100 of FIGS. 1 to 5 to the description of which reference is made in all other respects.

The main difference between the heavy-load vehicle 200 of FIG. 6 and the heavy-load vehicle 100 of FIGS. 1 to 5 is that it includes three partial vehicles, namely a frontmost partial vehicle 202 having the same design as the frontmost partial vehicle 102 of the heavy-load vehicle 100, a rearmost partial vehicle 204 having the same design as the rearmost partial vehicle 104 of the heavy-load vehicle 100 and carrying the vehicle end unit 230, and an intermediate partial vehicle 232.

The intermediate partial vehicle 232 has a frame 234 similar to the frame 120 of the rearmost partial vehicle 104 of the heavy-load vehicle 100. In particular, the frame 234 includes at its front end counter-connecting means 236 identical to the counter-connecting means 128 of the rearmost partial vehicle 104. At its rear end, however, it includes telescopable connecting means 238 identical to the connecting means 118 of the frontmost partial vehicle 102. Accordingly, the intermediate partial vehicle 232 easily fits between and may be connected to the frontmost partial vehicle 202 and the rearmost partial vehicle 204, increasing the length of the heavy-load vehicle 200 to three partial vehicles.

It goes without saying that, by providing a plurality of intermediate partial vehicles all having the identical design as intermediate partial vehicle 232, the length of the heavy-load vehicle may be increased as needed and/or desired.

Figure 7:
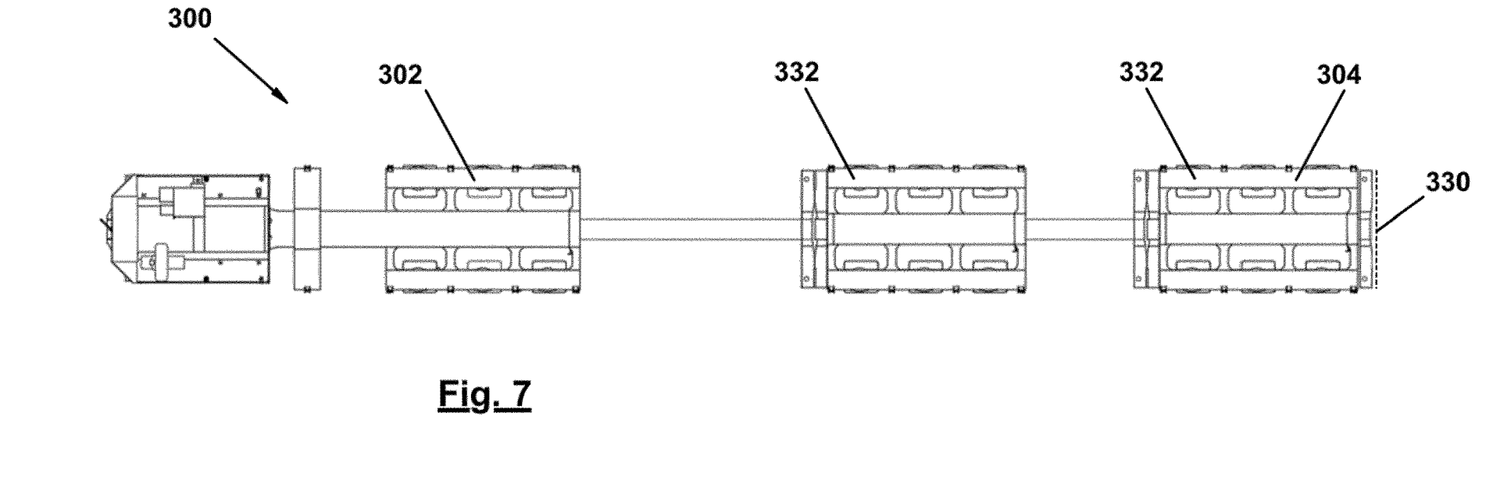
Figure 8:
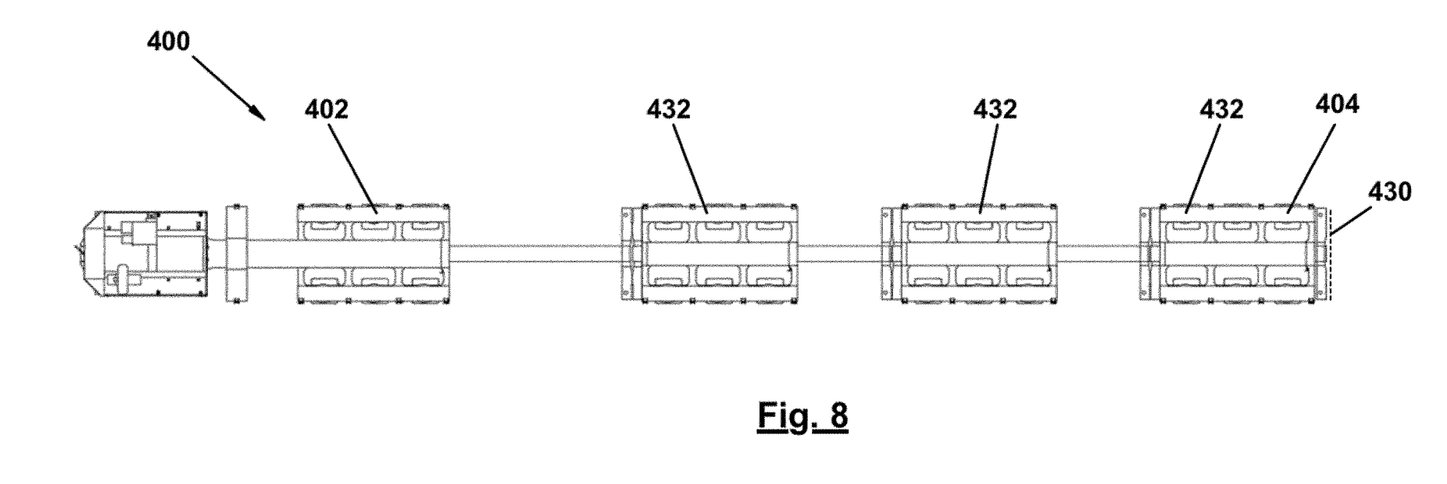

If the afore-mentioned vehicle end unit 230 is designed as a separate part which may be attached to the rear end of intermediate partial vehicle 232, a heavy-load vehicle of arbitrary length may be obtained by using only two types of partial vehicles, namely said frontmost partial vehicle and a plurality of identically designed intermediate partial vehicles, one of which constitutes the rearmost partial vehicle by having the vehicle end unit attached thereto. Examples of a heavy-load vehicle 300 having three partial vehicles, namely a frontmost partial vehicle 302 and two intermediate partial vehicles 332, one constituting the rearmost partial vehicle 304 to which the vehicle end unit 330 is mounted, and of a heavy-load vehicle 400 having four partial vehicles, namely a frontmost partial vehicle 402 and three intermediate partial vehicles 432, one constituting the rearmost partial vehicle 404 to which the vehicle end unit 430 is mounted, are shown in FIGS. 7 and 8, respectively.

Figure 9:
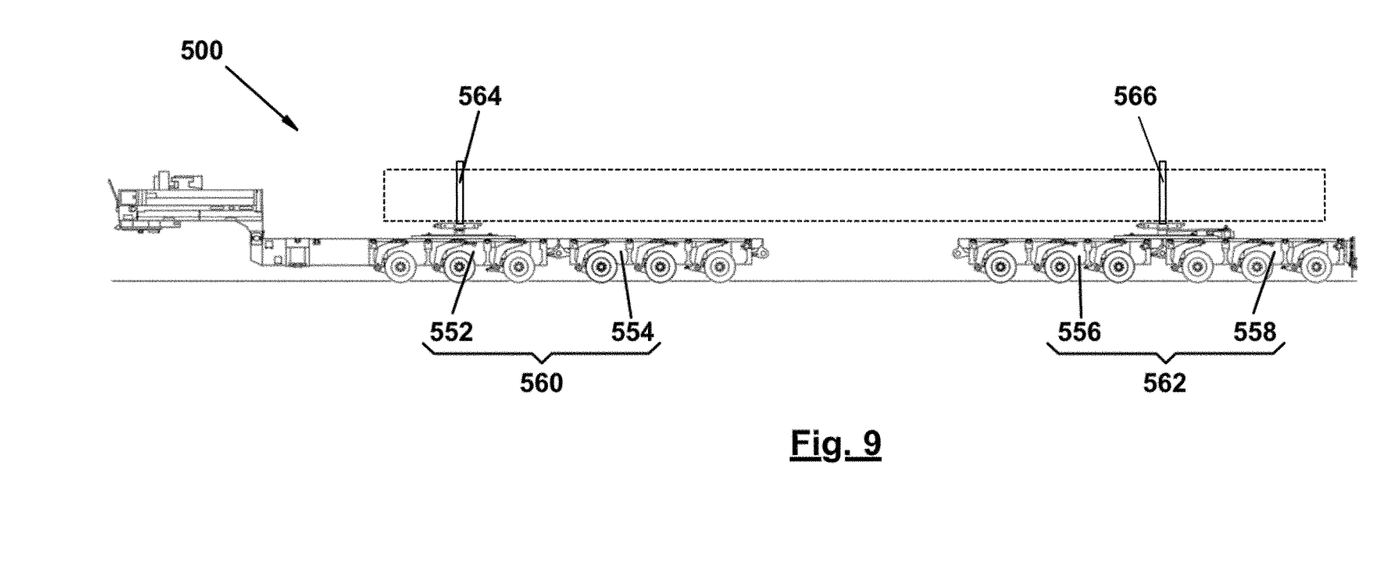

It should be noted that heavy-load vehicles according to the present invention may be used according to a plurality of different configurations depending upon the respect load transporting purpose. Referring to FIG. 9, it is, for example, conceivable to use the inventive concept for transporting long loads, e.g. concrete beams or steel pipes, schematically indicated as a dashed rectangle. In this case four partial vehicles 552, 554, 556, 558 may be combined in a paired arrangement, and each of the pairs 560, 562 of the heavy-load vehicle 500 may be equipped with a long load receiving unit 564, 566, respectively.

Figure 10:
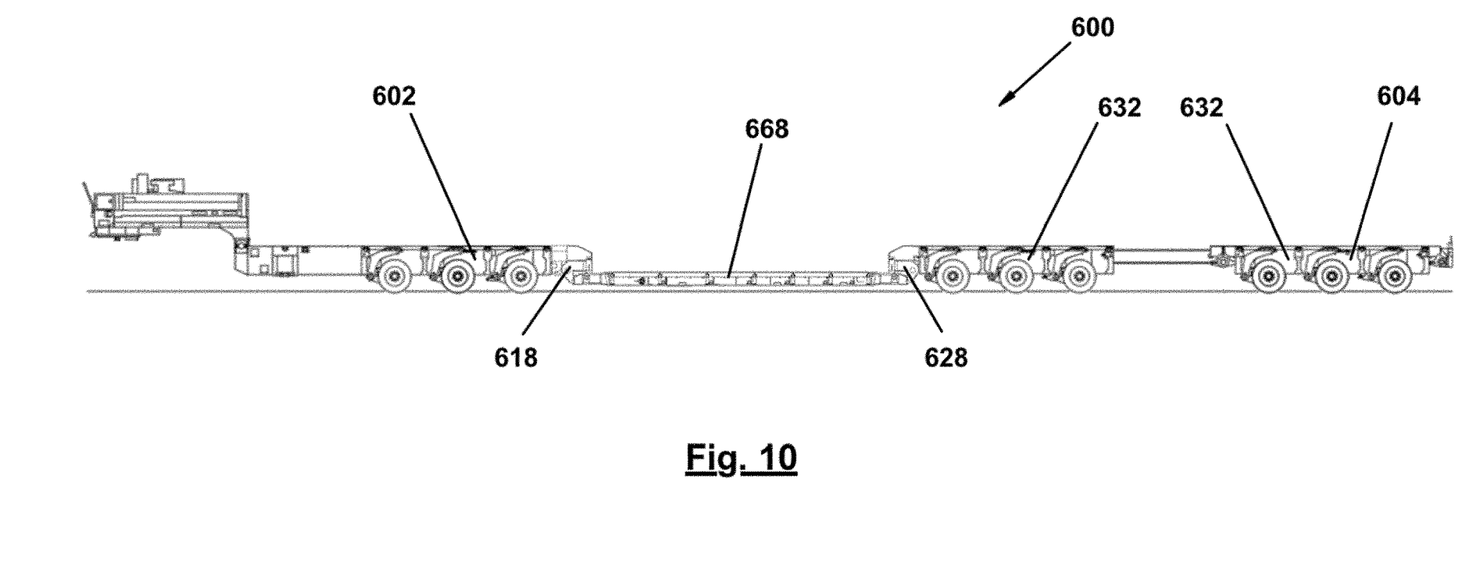

A further application may, for example, be to mount a drop deck between the frontmost partial vehicle and the rearmost partial vehicle. In the heavy-load vehicle 600 of FIG. 10, a drop deck 668 is mounted between a frontmost partial vehicle 602 and a pair of intermediate partial vehicles 632, one of which constitutes the rearmost partial vehicle 604. With respect to the present invention, it is to be noted that, although the frontmost partial vehicle 602 actually isn't connected to the intermediate partial vehicle 632, the connecting means 618 of the frontmost partial vehicle 602 and the counter-connecting means 628 of the intermediate partial vehicle 632 are adapted and configured for cooperating with each other for operatively connecting said frontmost partial vehicle 602 and said intermediate partial vehicle 632 to each other.

The invention claimed is:

1. A heavy-load vehicle comprising at least two partial vehicles, comprising:
   A frontmost partial vehicle including a tow connection device for connecting said heavy-load vehicle to a towing vehicle not being part of the heavy-load vehicle, wherein the tow connection device of the frontmost partial vehicle comprises a gooseneck or a drawbar at the frontmost partial vehicle, wherein the frontmost partial vehicle is a first of two immediately consecutive partial vehicles; and
   a rearmost partial vehicle, wherein the rearmost partial vehicle is a second of the two immediately consecutive partial vehicles,
   wherein the frontmost partial vehicle comprises connecting means, wherein the rearmost partial vehicle comprises counter-connecting means configured to cooperate with the connecting means for operatively connecting the frontmost partial vehicle and the rearmost partial vehicle to each other, the connecting means of the frontmost partial vehicle comprising an inner telescopic member guided in a hollow outer telescopic member in a telescoping manner,
   wherein the hollow outer telescopic member is integrally formed by a tubular or box-shaped central part of a frame of the frontmost partial vehicle, the hollow outer telescopic member and the inner telescopic member cooperating therewith being parts of the frontmost partial vehicle, and
   wherein a first plate part of a bolt-plate coupling is mounted at the free end of the inner telescopic member of the frontmost partial vehicle, while a second plate part designed to cooperate with the first plate part via a bolt of the bolt-plate coupling is mounted to a facing end of the rearmost partial vehicle.

2. The heavy-load vehicle of claim 1, wherein the inner telescopic member has a length which is equal to or less than the length of the outer telescopic member.

3. The heavy-load vehicle of claim 1, further comprising a vehicle end unit attachable to a rear end of the rearmost partial vehicle.

4. The heavy-load vehicle of claim 1, further comprising at least three types of partial vehicles comprising the frontmost partial vehicle, the rearmost partial vehicle and at least one intermediate partial vehicle,
   wherein the at least one intermediate partial vehicle comprises a hollow outer telescopic member and an inner telescopic member guided in the outer telescopic member in a telescoping manner, the hollow outer telescopic member being integrally formed by a tubular or box-shaped central part of a partial vehicle frame of the at least one of intermediate partial vehicle, the hollow outer telescopic member and the inner telescopic member cooperating therewith being parts of the same intermediate partial vehicle.

5. The heavy-load vehicle of claim 1, wherein the inner telescopic member is adapted to extend out of the cooperating hollow outer telescopic member to the rear side of the rearmost partial vehicle.

6. The heavy-load vehicle of claim 1, wherein the inner telescopic member is adapted to extend out of the cooperating hollow outer telescopic member to the front side of the rearmost partial vehicle.

7. The heavy-load vehicle of claim 1, wherein an intermediate telescopic member is sandwiched in a telescoping manner between the inner telescopic member and the hollow outer telescopic member.

8. The heavy-load vehicle of claim 1, wherein the outer telescopic member and the inner telescopic member have a rectangular cross-section.

9. The heavy-load vehicle of claim 1, wherein the first plate part is welded to the free end of the inner telescopic member of the frontmost partial vehicle and wherein the second plate part is welded to the facing end of the partial vehicle frame of the rearmost partial vehicle.

10. The heavy-load vehicle of claim 1, wherein at least two of the partial vehicles comprise at least one wheeled axle.

11. The heavy-load vehicle of claim 10, wherein at least one wheeled axle includes two wheeled axle units.

12. The heavy-load vehicle of claim 1, further comprising at least one additional component comprising at least one long load receiving unit or a drop deck.

13. The heavy-load vehicle of claim 7, wherein the intermediate telescopic member has a rectangular cross-section.

14. The heavy-load vehicle of claim 10, wherein all partial vehicles include at least one wheeled axle.

15. The heavy-load vehicle of claim 10, wherein the at least two of the partial vehicles include at least two wheeled axles.

16. The heavy-load vehicle of claim 10, wherein at least two of the partial vehicles include at least three wheeled axles.

17. The heavy-load vehicle of claim 11, wherein the two wheeled axle units comprise two pendular axle units.

18. The heavy-load vehicle of claim 11, wherein the two wheeled axle units comprise two actively steerable pendular axle units or full-floating axle units.

* * * * *